United States Patent [19]

Friedman

[11] 4,200,382
[45] Apr. 29, 1980

[54] PHOTOGRAPHIC PROCESSING ROLLER AND A NOVEL METHOD WHICH UTILIZES A PULSED LASER FOR MANUFACTURING THE ROLLER

[75] Inventor: Harvey S. Friedman, Sudbury, Mass.

[73] Assignee: Polaroid Corporation, Cambridge, Mass.

[21] Appl. No.: 938,092

[22] Filed: Aug. 30, 1978

[51] Int. Cl.² ............................................. G03D 9/02
[52] U.S. Cl. ......................... 354/304; 354/86; 219/121 L; 219/121 LM; 29/121.1
[58] Field of Search .................. 354/84, 85, 86, 87, 354/303, 304; 219/121 L, 121 LM; 29/121.1, 121.4, 121.5, 121.6, 121.8; 346/76 L

[56] References Cited

U.S. PATENT DOCUMENTS

| Re. 28,027 | 6/1974 | Bills et al. ............................... 82/57 |
| 3,310,423 | 3/1967 | Ingham ................................ 427/53.1 |
| 3,447,221 | 6/1969 | Odiorne ............................... 29/121.1 |
| 3,596,045 | 7/1971 | Steigerwald .................... 219/121 EK |
| 3,657,510 | 4/1972 | Rothrock ......................... 219/121 L |
| 3,755,646 | 8/1973 | Muller ........................... 219/121 LM |
| 3,796,361 | 3/1974 | Rueckert ............................. 226/193 |
| 3,877,042 | 4/1975 | Douglas ................................ 354/86 |
| 3,924,313 | 12/1975 | Broderick ........................... 29/121.8 |
| 3,941,970 | 3/1976 | Grow ................................... 219/69 R |
| 3,947,653 | 3/1976 | Fairbairn ............................. 219/76.1 |
| 4,128,752 | 12/1978 | Gravel ............................. 219/121 L |
| 4,131,782 | 12/1978 | Einstein et al. ............. 219/121 LM |
| 4,147,425 | 4/1979 | Friedman et al. .................... 354/304 |

Primary Examiner—L. T. Hix
Assistant Examiner—Alan Mathews
Attorney, Agent, or Firm—Francis J. Caufield

[57] ABSTRACT

An improved cylindrical processing roller is provided for use in a motor driven photographic processing apparatus of the type which spreads a fluid processing composition in a thin, substantially uniform layer between selected layers of integral type self-processable film units while advancing the film units to the exterior of a camera after they have been photoexposed. The improvement in the roller resides in a novel circumferential roller surface roughened by a method which utilizes a pulsed laser to form a plurality of microscopic craters in the surface. The cratered surface provides the roller with a high-friction characteristic for transporting the film units but is insufficiently rough to leave any visually perceptible marks on them.

14 Claims, 4 Drawing Figures

PHOTOGRAPHIC PROCESSING ROLLER AND A NOVEL METHOD WHICH UTILIZES A PULSED LASER FOR MANUFACTURING THE ROLLER

BACKGROUND OF THE INVENTION

1. Field of the Invention

This invention in general relates to photographic apparatus and in particular to improved cylindrical processing rollers for use in motor driven photographic processing apparatus of the type which spread a fluid processing composition in a thin, substantially uniform layer between selected layers of integral type, self-processable film units while advancing them to the exterior of a camera after they have been photoexposed.

2. Description of the Prior Art

Fully automatic photographic cameras which utilize integral type self-processable film units are well-known in the photographic field having been extensively described in the patent literature and in public use for several years now. These cameras, such as Polaroid Corporation's "SX-70" and "Pronto!" and Eastman Kodak Company's "EK-6" and "EK-8" cameras, are designed to automatically produce finished, waste-free color prints with virtually no operator involvement other than to compose the picture, perhaps focus, and then actuate the camera by depressing its cycle "start" button.

They accomplish this task through the use of specially designed interdependent function providing subsystems that are organized to carry out a programmed series of sequential operations which produce the finished print.

Once actuated, the order of camera operations begins with exposure of a film unit. Afterwards, the exposed film unit is advanced from its exposure location into engagement with a film processing subsystem or apparatus which initiates a diffusion transfer process in the film unit while transporting it to the exterior of the camera where it becomes accessible to the photographer. After the diffusion transfer process is initiated, it develops and forms a visible image in the film unit in a well-known manner.

The film units, as for example those described in considerable detail in U.S. Pat. Nos. 3,415,644; 3,594,165; and 3,761,268, normally contain all the photographic components necessary for the diffusion transfer process. Typically, the film units comprise, in general terms, a pair of superposed sheet elements, at least one being transparent, which serve to support layers of photochemical substances which may comprise photosensitive and image-receiving layers; and, as well, include a rupturable container of viscous processing fluid positioned adjacent a leading edge of the film unit and adapted to have its processing fluid released between the sheet elements to begin the diffusion transfer process. Release of the processing fluid is effected by the processing apparatus which operates to rupture the container and thereafter causes the released mass of processing fluid to flow between the sheet elements, opposite the direction of travel of the film unit, so that the processing fluid is progressively deposited between the sheet elements as a thin, uniform layer generally coextensive with the exposed area of the film unit. Upon completion of the diffusion transfer process, the final image is viewable through the film unit's transparent sheet element.

Photographic processing apparatus having the capability of performing the film advancing and fluid spreading operations outlined above are well-known in the art. Generally, such apparatus comprise a pair of rollers rotatably mounted in juxtaposed relation and resiliently urged toward one another to exert a pressure on the film unit as it is advanced between them in response to rotation of at least one of the rollers by a motor drive. The rollers typically are manufactured to precision tolerances so that the fluid layer thickness is properly sized for optimum photographic image quality and at least one of them is provided with a high-friction, sheet-contacting surface to provide a high traction force to transport the film unit to the outside of the camera without slippage and without visably damaging the surfaces of the film unit.

In addition to the precision tolerances and the high-friction, low-abrasion surface characteristic, these rollers generally are made of high strength alloys so that they either won't deform under the pressures generated during processing or deform only in a predictable manner, have high corrosion resistance, and are capable of retaining their original geometry after having processed a predetermined number of film units which is related to their expected useful life.

Another important feature these type of rollers have is their ability not to pick up particulate matter from the film units during processing. This feature is important since a substantial build up of particulate matter on the roller's surfaces would change their initial geometry and thereby compromise their fluid spreading and/or film transport performance.

One prior art device which satisfies the functional criteria for such film processing apparatus is described in considerable detail in U.S. Pat. No. 3,776,118 issued to John J. Driscoll et. al. on Dec. 4, 1973 and entitled "Photographic Film Processing Apparatus." Here the processing apparatus includes a roller assembly having first and second rotatably mounted juxtaposed elongated rollers which are resiliently urged toward one another. A pair of annular collars are provided on the first roller to define a minimum gap between the rollers to facilitate the initial introduction of the leading edge of a film unit between the rollers. The first roller is adapted to be selectively driven by a motor of the camera and, when so driven, its annular collars impart a rotary motion to the second roller. At least those portions of the two rollers adapted to contact one another are formed of a relatively low friction, impact resistant material, such as stainless steel, while at least the sheet-contacting facing surface of the first roller is formed of a relatively high friction material such as urethane. The urethane which is coated on the first roller operates to provide the relatively high traction force between the first roller and the film unit to transport the film unit outside of the camera and the stainless steel provides the strength necessary to withstand the pressures generated during the transport and fluid spreading phases. In addition to its strength, the stainless steel also possesses desirable corrosion resistant characteristics.

Although the performance of this type device is more than adequate as evidenced by its success in Polaroid Corporation's "SX-70" and "Pronto!" cameras, it is, as one would expect from its design criteria, relatively expensive to manufacture. The urethane coating coupled with the precision tolerances in particular represent a major portion of its cost.

Another motor driven processing apparatus is that used in Eastman Kodak Company's "EK-6" and "EK-8" cameras. Here both rollers, which appear to be surface-hardened, steel, are motor driven and each has a roughened surface to provide the high traction force necessary for film transport. It appears that the roughened surfaces of these rollers may be achieved by conventional crush grinding techniques and may afterwards be plated for corrosion protection and wear resistance. The roughened surfaces of these rollers would also appear to be relatively expensive to manufacture.

A third example of a photographic processing roller suitable for use with integral self-processable film is described in U.S. patent application Ser. No. 901,910 filed on behalf of Harvey S. Friedman et. al. on May 1, 1978 and entitled "Photographic Processing Roller Having A Surface Roughened By Electric Discharge Machining." Here the roller's high-friction, low-abrasion surface is achieved by electric discharge machining a plurality of microscopic craters randomly spaced over a predetermined area of a roller's smoothly machined surface. The craters thus formed are sufficiently large to satisfy the high-friction requirement yet not so large that they mark the film during transport and processing.

The primary object of the present invention is to provide a photographic processing roller which satisfies the criteria outlined above by using a novel method which utilizes a pulsed laser to form a roughened surface which has a high-friction, low-abrasion characteristic.

Other objects of the invention will in part be obvious and will in part appear hereinafter. The invention accordingly comprises the apparatus and method which are exemplified in the following detailed disclosure.

SUMMARY OF THE INVENTION

This invention, in general, relates to photographic apparatus and in particular to an improved cylindrical processing roller for use in a motor driven photographic processing apparatus of the type for advancing an integral type self-processable film unit to the exterior of a camera while simultaneously spreading a fluid processing composition between selected layers of the film unit and of the type having a circumferential surface of given length machined to a precision diameter to facilitate spreading the fluid processing composition in a substantially uniform thin layer between the film unit's selected layers. The improvement comprises a plurality of generally spaced apart, substantially uniform sized and shaped microscopic craters formed along a predetermined length of the roller's surface by a novel method which utilizes a pulsed laser. The craters cover a predetermined percentage of the area of the roller's predetermined surface and each is surrounded by a substantially uniform annular lip which extends above the surface by an amount insufficient to mark the film unit's surfaces. The roller surface is thus configured to provide the roller with a high-friction characteristic for transporting a film unit while being insufficiently rough to leave any visually perceptible marks on a film unit's surfaces, to minimize pickup of particulate matter from the film unit which would otherwise build up and reduce the high-friction characteristic, and to maintain the effectiveness of the roller's precision diameter so that substantially no change in its fluid spreading performance results from the presence of the craters.

In the illustrated embodiment of the improved roller, the microscopic craters are oval shaped, having a major diameter of approximately 0.003 inches, a minor diameter of approximately 0.002 inches and the mean height of each crater's annular lip, above the surface, is 80 microinches. Also, the mean number of microscopic craters per square inch is 55,000 so that the craters cover approximately 30 percent of the area of the roller's predetermined surface length.

The novel method used to form the microscopic craters utilizes a Q-switched laser whose beam is focused at a predetermined point past which the roller's surface is moved by rotating the roller and translating the roller and laser beam relative to one another at predetermined rates while the laser is pulsed on and off at a predetermined frequency.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
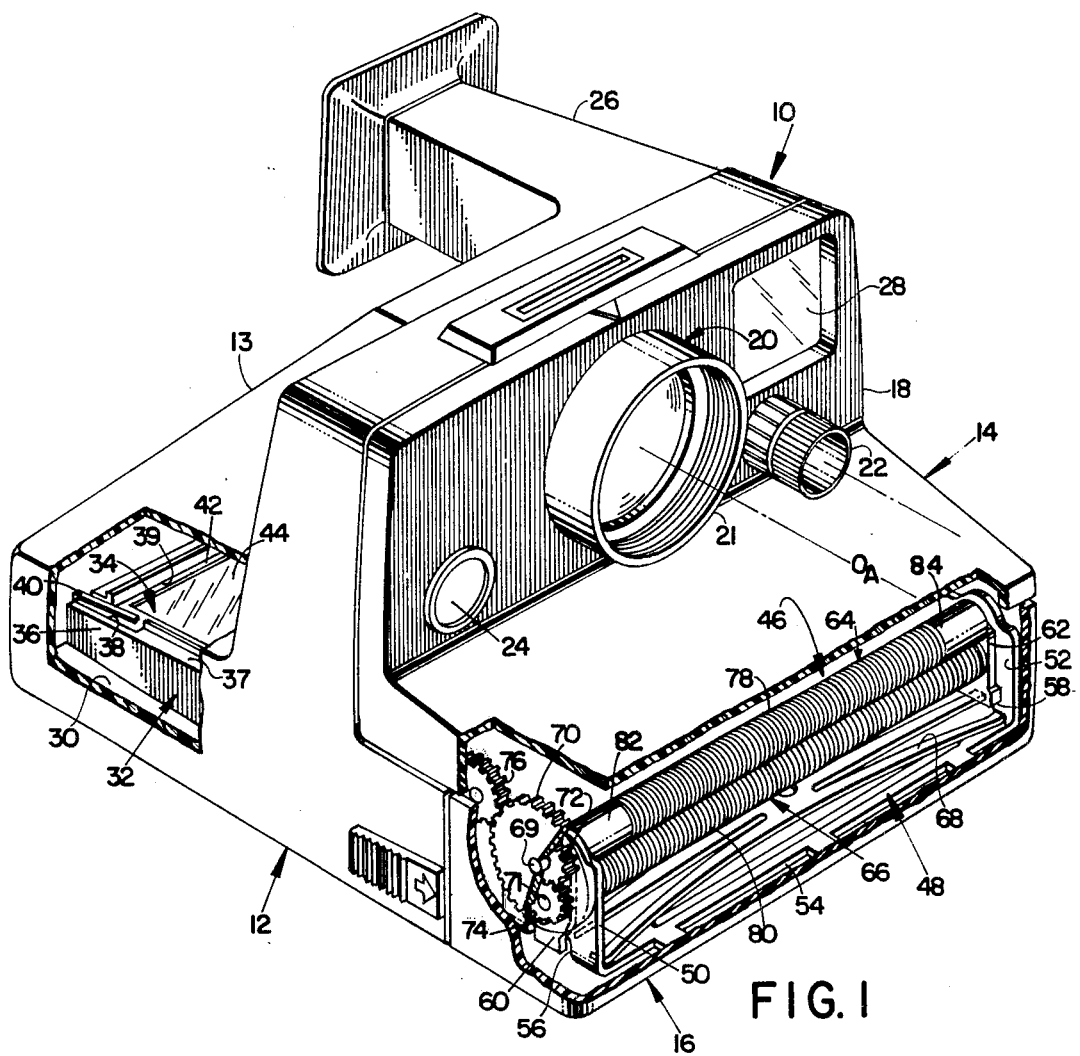
FIG. 1 is a perspective view, with parts broken away, of a self-processable type camera embodying the present invention.

Referring now to FIG. 1, there is shown a fully automatic camera 10 of the type which uses integral, self-processable film units and in which the improved photographic processing roller of the present invention is incorporated.

The camera 10 comprises a body 12, a front cover 14, and a door 16 which interconnect to define its outward appearance and serve as a protective enclosure for housing the camera's interior components.

Located in a vertical forward wall 18 of the front cover 14 is an objective taking lens 20 having an optical axis, OA, therethrough. The objective taking lens 20 may be a Cooke Triplet or similar multi-element type of lens which can have its focal length changed by adjusting the axial air spacing between its optical elements. This may be accomplished in a well-known manner by rotating a bezel, such as that designated at 21, which extends through an opening in the front cover 14 and is coupled with a screw-threaded lens mount (not shown).

Formed in the base of the body 12 is a well-known film cassette receiving chamber 30 which is adapted to releasably hold a film cassette such as that designated at 32. The cassette 32 comprises a generally rectangular parallelepiped housing 36 which has an upwardly facing wall 37 having a generally rectangular aperture 39 therein. Mounted in registration with and biased toward the aperture 39 is a stacked array of integral type self-processable film units generally designated at 34. Underneath the stacked array of film units 34 is a flat, thin battery (not shown) which may be used to supply power to the various electrical components of the camera 10.

Each film unit 34 comprises a pair of superposed sheet elements including a top transparent sheet 44, preferably formed of mylar, beneath which is a bottom sheet that is not shown. Positioned adjacent the leading edges of the film unit's sheet elements is a rupturable container of viscous processing fluid or composition (not shown) adapted to have its contents spread between the film unit's sheet elements to effect a diffusion transfer process after photoexposure.

Each film unit's sheet elements, and the rupturable container are bound together by a binding element 42 which overlaps their lateral edges and has portions adhered to their outwardly facing surfaces. The peripheral edges of the binding element 42 which terminate on the outer surfaces of the transparent sheet 44 are generally coextensive with the aperture 39 of the film cassette 32 and as such define the area of each film unit 34 which may be exposed through the top transparent sheet 44. Also the longitudinal edges of the film unit's sheet elements which are bound by the element 42 operate in a well-known manner to at least in part define the thickness of the layer of processing fluid which can be spread between the film unit's sheet elements.

An example of such a film cassette is described in considerable detail in U.S. Pat. No. 3,872,487 issued to Nicholas Gold on Mar. 18, 1975 and entitled "Photographic Film Assemblage and Apparatus" and of such film units in previously mentioned U.S. Pat. Nos. 3,415,644; 3,594,165; and 3,761,268.

The body 12 also includes a generally planar rear wall 13 slanted at a predetermined angle with respect to both the film cassette 32 and the optical axis, OA, of the objective taking lens 20. Attached to the interior of the rear wall 13, but not shown, is a trapezoidal-shaped mirror positioned along the optical axis, OA, intersecting it at a predetermined angle, to provide a folded optical path between the objective taking lens 20 and the forwardmost one of the stacked array of film units 34. With this optical arrangement, rays from a scene which emerge from the objective taking lens 20 are reflected from the mirror toward the film units 34.

Exposure of the film units 34 is regulated automatically by a well-known exposure control system which is located, but not shown, behind the front cover's vertical forward wall 18.

Located to the right of the objective taking lens 20 is an optical system 22 which is used to direct scene light ot a photodetector (not shown) which forms part of the camera's exposure control system.

To the left of the objective taking lens 20 is a camera start button 24 which, when actuated, initiates, in a well-known manner, a camera operating cycle.

Once a camera operating cycle is initiated, photoexposure of a forwardmost one of the film units 34 is effected in the manner previously outlined. The photoexposed film unit is then advanced toward the forward end of the camera 10 where it is brought into engagement with a film processing apparatus 46 which includes improved rollers according to the present invention.

Advancement of a photoexposed film unit 34 is accomplished via a pick member 40 which fits a slot 38 of the film cassette housing 36 and engages a portion of the film unit's trailing edge. The pick member 34 is actuated by a well-known film advancing apparatus to which it is attached to move toward the processing apparatus 46 a predetermined distance while pulling a photoexposed film unit 34 along with it.

Such a film advancing arrangement is described in considerable detail in, for example, U.S. Pat. No. 3,047,192 issued to Bruce K. Johnson et. al. on September 6, 1977 and entitled "Photographic Apparatus With Sequencing System."

The film processing apparatus 46 is mounted in a well-known manner on the door 16 to pivot downwardly thereby providing access to the film cassette receiving chamber 30 so that the film cassette 32 can be loaded or removed therefrom. As an example of this arrangement, reference may be had to U.S. Pat. No. 3,974,510 issued to Andrew S. Invester on Aug. 10, 1976 and entitled "Mounting Apparatus for a Spreader Roller Assembly."

The processing apparatus 46 comprises a "U"-shaped support bracket 48 which includes a base 54 attached to the door 16. The base 54 has two spaced apart vertical legs, 50 and 52, depending upwardly therefrom. Formed in each vertical leg, 50 and 52, are vertically oriented slots, 56 and 58, respectively. Slidably disposed in each vertical slot, 56 and 58, are complementary configured bearing blocks, 60 and 62, respectively, in which are mounted for rotation the journals of a cylindrical bottom roller 66. The bottom roller 66 thus arranged can rotate with respect to the bearing blocks, 60 and 62, while the bearing blocks, 60 and 62, can slide up or down in their respective slots, 56 and 58.

Opposed end portions of a bow-shaped spring 68 engage, respectively, the bottoms of the bearing blocks, 60 and 62, to resiliently urge the roller 66 upwardly.

Rotatably mounted above the bottom roller 66 is a top roller 64 whose journals fit complementary shaped bearings (not shown) which are pressed into the upper end of the vertical legs 50 and 52. In this manner, the rollers 64 and 66 are rotatably mounted in juxtaposed relationship to define a pressure generating gap between them through which a film unit 34 can be advanced by rotating the rollers, 64 and 66, in a manner to be described.

Fixedly mounted on a journal 69 of the top roller 64 is a compound spur gear comprising a gear 70 meshed with a pinion gear 76 and a gear 72 meshed with a gear 74 which is fixedly attached to a journal 71 of the bottom roller 66.

The pinion gear 76 is driven by a well-known motor powered gear train (not shown) to cause the rollers 64 and 66 to rotate, via the gearing arrangement outlined, to advance a photoexposed film unit 34 to the exterior of the camera 10 while spreading its self-contained processing fluid in a substantially uniform thin layer between its sheet elements.

Such a gearing arrangement is described in detail, for example, in U.S. Pat. No. 4,051,492 issued to Irving Laskin et. al. on Sept. 27, 1977 and entitled "Photographic Apparatus Gear Train Having a Unique Set of Gears."

The cylindrical processing rollers, 64 and 66, are preferably formed of stainless steel and have their circumferential surfaces machined to a precision diameter (tolerances held to ±5 tenths of a mil) to facilitate spreading of the film unit's processing fluid.

As seen in FIG. 1, the circumferential surfaces of each roller, 64 and 66, are provided with the invention's improved roughened surfaces, 78 and 80, respectively, to provide them with a high-friction characteristic for transporting film units 34 without leaving any visually perceptible marks on them, particularly their transparent mylar top sheets 44.

Figure 2:
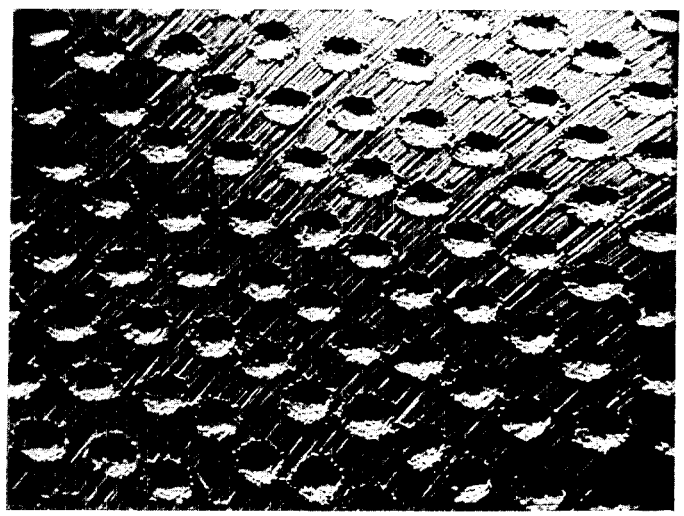
FIG. 2 is a photograph of the surface of the processing roller of the invention at 100 magnification.
Figure 3:
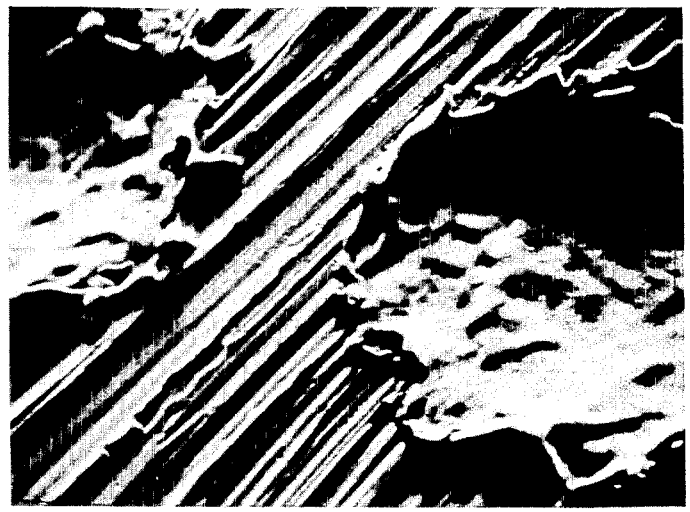
FIG. 3 is another photograph of the surface of the processing roller of the invention except at 1000 magnification.

The improved roughened surfaces, 78 and 80, as best seen in FIGS. 2 and 3, comprise a plurality of spaced apart, substantially uniform sized and shaped microscopic craters formed along a predetermined length of each roller's circumferential surface by a novel method which utilizes a pulsed laser to form the craters in a manner to be described.

The top roller's improved surface 78 is centrally disposed along its full length leaving a pair of spaced apart smooth end sections, 82 and 84, which are unroughened (no craters) so as to reduce the possibility of picking up particulate matter from the film units 34, particularly from their masked longitudinal edges over which the end sections, 82 and 84, ride while the film units 34 are transported between the rollers, 64 and 66.

However, the bottom roller's roughened surface 80 extends across the entire length of the bottom roller's circumferential surface.

The craters, as can be seen in FIG. 2, preferably cover approximately 30 percent of the area corresponding to the predetermined length of the roller's circumferential surfaces over which they extend. However, the craters may cover a higher percentage of area and still be operative but should not exceed 50 percent area coverage for optimum overall function.

Each crater, as best seen in FIG. 3, is surrounded by a substantially uniform generally annular lip which extends above its corresponding roller's smooth (uncratered or untextured) surface. The volume of each crater's annular lip generally equals the volume of the "bowl" shaped portion of the crater which is below the roller's smooth surface. Thus, each crater's annular lip represents a mass of stainless steel formed generally by displacing material with a minimum stock removal.

The height to which each annular lip extends above the smooth roller surface is chosen so that it provides an increase in friction compared to the unroughened roller. However, the lip height is not so high as to cause visually perceptible marks in the film units 32.

For Polaroid Corporation's "SX-70 Land" type film, it has been found that the lip height should not exceed 0.00035 inches. However, the preferred mean lip height for the embodiment illustrated is 80 microinches.

The craters of the illustrated embodiment are oval shaped having a major diameter of approximately 0.003 inches and a minor diameter of approximately 0.002 inches. The mean number of craters per square inch of surface area of the illustrated embodiment is 55,000 and its surface roughness as measured with a standardized profilometer (Bendix Model S-48 Proficorder) is between 35 and 70 microinches/inch (AA).

Structured in this manner, the improved roughened surfaces, 78 and 80, of the rollers, 64 and 66, respectively not only are provided with a high-friction, low-abrasion characteristic but, as well, are configured to minimize pick up of particulate matter from the film units 34 and to maintain the effectiveness of each roller's precision diameter so that substantially no change in its fluid spreading performance results from the presence of the craters.

It is important that the craters be generally spaced apart to minimize pickup of particulate matter from the film units. It build up of particulate matter were to occur, the high-friction characteristic gained by the addition of the craters would be reduced thereby defeating their purpose. An additional problem caused by build up is a change in the roller's precision diameter causing it to have an effective diameter larger than intended. The effective diameter can also change if too many craters are applied to the roller's surface, e.g. more than 50 percent by area coverage, and are spaced too close together.

Figure 4:
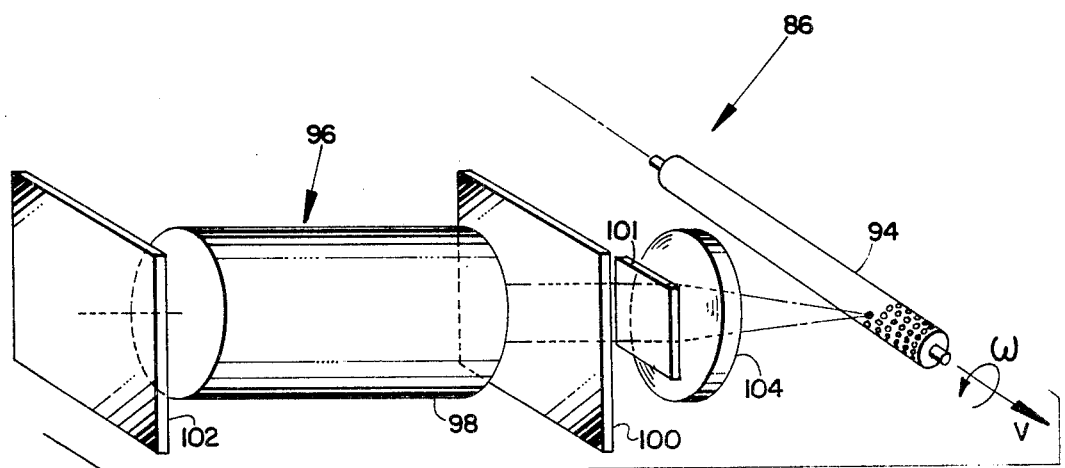
FIG. 4 is a diagrammatic perspective view of apparatus by which the roller surface of the invention can be formed.

Referring now to FIG. 4, there is shown diagrammatically at 86 apparatus by which a novel method can be practiced to form the craters in the roller's circumferential surfaces according to the criteria outlined above.

A roller 94 is mounted for rotation at a predetermined angular rate, $\omega$, about its axis of revolution and for translation at a predetermined linear rate, v, in a direction collinear with its axis of revolution while rotating at angular rate, $\omega$. Such a mounting arrangement can be implemented with well-known fixturing and motor drives.

Stationed in a predetermined spatial orientation with respect to the roller 94 is a conventional pulsed laser designated generally at 96. The laser 96 comprises a laser rod 98 preferably of the Nd-YAG type. Arranged at opposite ends of the laser rod 98 are a partial mirror 100 and a well-known Q-switching mirror 102 respectively. Positioned forwardly of the mirror 100 is a beam expander 101 to increase the diameter of the laser beam. A focusing lens 104 is positioned forwardly of the beam expander 101 to intercept the laser's beam and focus it on the circumferential surface of the roller 94 so that the laser's beam when activated is substantially perpendicular to the roller's surface. With this arrangement, the amount of energy in the image of the laser's pulsing beam, formed on the roller's circumferential surface, can be precisely controlled both in duration and magnitude to locally melt small areas of the roller material on which the laser is focused and the crater shape can be manipulated through the use of the beam expander 101 and the focus of the lens 104.

To form the craters, the laser 96 is activated in a well-known manner and substantially simultaneously therewith the roller is rotated and translated at its predetermined rates, $\omega$ and v, respectively past the laser's focused beam to locally melt the roller's surface at fixed intervals while the roller moves past the laser beam. In this manner a plurality of microscopic craters which are substantially uniformly spaced with respect to one another are formed over a predetermined area of the roller's surface.

The actual size, depth and spacing of the craters is related to the laser pulse's energy distribution in time and the manner in which it is focused, the roller's material composition, and the angular and linear rates, $\omega$ and v, which determine the relative speed at which the roller's surface is advanced past the point at which the laser is focused.

The surface of the illustrated embodiment is achieved by rotating the roller (approximately ¼" diameter stainless steel) at 1,800 RPM while translating it at 0.36 inches per second past a Nd-YAG pulsed laser which is operated at a pulse frequency of 10,000 CPS. The average power delivered in each pulse is 10 watts over a 600 nanosecond period. The initial surface finish of the uncratered roller is generally less than 16 microinches/inch (AA). The laser is operated in its $TEM_{oo}$ mode, the beam expander 101 is a 6× magnification, and the lens 104 is a converging type with a 48 mm focal length.

Certain changes may be made in the above described embodiment without departing from the scope of the invention, and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. In an improved cylindrical processing roller for use in a motor driven photographic processing apparatus of the type for advancing an integral type self-processable film unit to the exterior of a camera while simultaneously spreading a fluid processing composition between selected layers of the film unit and of the type having a circumferential surface of given length machined to a precision diameter to facilitate spreading the fluid processing composition in a substantially uniform thin layer between the film unit's selected layers, the improvement comprising a plurality of generally uniformly spaced apart, substantially uniform sized and shaped microscopic craters each of which is formed along a predetermined length of said surface by locally melting said surface with a low energy laser pulse, said craters covering a predetermined percentage of the area of said predetermined surface and each being surrounded by a substantially uniform generally annular lip which extends above said surface by an amount insufficient to mark the film unit's surface, said roller surface being thus configured to provide said roller with a high-friction characteristic for transporting a film unit while being insufficiently rough to leave any visually perceptible marks on a film unit surface, to minimize pickup of particulate matter from the film unit which would otherwise build up and reduce said high-friction characteristic, and to maintain the effectiveness of said roller's precision diameter so that substantially no change in its fluid spreading performance results from the presence of said craters.

2. The improved roller of claim 1 wherein said craters cover no more than 50 percent of the area of said roller's predetermined surface.

3. The improved roller of claim 1 wherein said microscopic craters are oval shaped having a major diameter of approximately 0.003 inches and a minor diameter of approximately 0.002 inches and wherein the mean height of said crater's annular lip above said surface is 80 microinches.

4. The improved roller of claim 1 wherein the maximum height to which said lips of said craters extend above said surface does not exceed 0.00035 inches.

5. The improved roller of claim 3 wherein the mean number of said microscopic craters per square inch is 55,000 so that said craters cover approximately 30.0 percent of said surface's total area.

6. The improved roller of claims 1 or 5 wherein said roller's surface has a finish within the range of 35 to 70 microinches per inch (AA).

7. The improved roller of claim 1 wherein said roller is fabricated of stainless steel.

8. The improved roller of claim 1 wherein said predetermined length of said roller's surface is centrally disposed along said roller's given length.

9. A method for roughening the surface of a cylindrical processing roller of the type which is used in a motor driven photographic processing apparatus for advancing an integral type self-processable film unit to the exterior of a camera while simultaneously spreading a fluid processing composition between selected layers of the film unit and which has a circumferential surface of given length machined to a precision diameter to facilitate spreading of the fluid processing composition in a substantially uniform thin layer between the film unit's selected layers, said method comprising the steps of:

mounting a roller and a low energy laser aimed at the roller's surface and having a predetermined power output and pulse rate for translation of the laser's beam relative to the roller's surface while the roller is rotated about its axis of revolution; and activating the laser to operate in a Q-switched pulse mode and substantially simultaneously therewith rotating the roller at a predetermined angular velocity about its axis of revolution and translating the aimed laser and the roller at a predetermined linear velocity relative to one another in a direction substantially parallel with the roller's axis of revolution to locally melt the roller's surface at fixed intervals while the roller and the laser's beam move relative to one another thereby forming over a predetermined area of the roller's surface a plurality of substantially uniform sized microscopic craters which are substantially uniformly spaced with respect to one another whereby the roller's surface is provided with a high-friction characteristic for transporting a film unit.

10. The method of claim 9 further including the steps of placing a laser beam expander in beam intercepting relationship to said laser's beam to increase the diameter of said laser's beam and a converging lens in beam intercepting relationship to said laser's expanded beam to focus said laser's beam on the roller's circumferential surface whereby the shape of said microscopic craters can be controlled by changing the diameter and focusing of said laser's beam.

11. The method of claim 10 wherein said laser's given power output and pulse rate are selected so that each crater formed thereby includes a substantially uniform generally annular lip which surrounds the crater and extends above the roller's circumferential surface by an amount insufficient to mark the film unit's surface whereby the roller is provided with a high-friction characteristic for transporting a film unit while being insufficiently rough to leave any visually perceptible marks on its surface.

12. The method of claim 11 wherein said laser's given power output and pulse rate and said roller's rate of rotation and said rate of translation of the roller with respect to said laser's beam are selected so that the percentage of the roller's circumferential surface area covered by said microscopic craters does not exceed 50 percent whereby the roller's roughened surface is configured to minimize pickup of particulate matter from the film unit which would otherwise build up and reduce said high-friction characteristic and to maintain the effectiveness of the roller's precision diameter so that substantially no change in its fluid spreading performance results from the presence of said craters.

13. The method of claims 10 or 12 wherein a roller is comprised of ¼ inch diameter stainless steel, wherein said rates of rotation and relative translation of said roller with respect to said laser beam are 1800 RPM and 0.36 IPS respectively, and wherein said laser is Q-switched at a frequency of 10,000 CPS, is operated in its $TEM_{oo}$ mode, and has an average pulse power of 10 watts and a pulse width of 600 nanoseconds.

14. The method of claim 13 wherein said beam expander is selected to have a 6× magnification and said converging lens has a focal length of 48 mm.

* * * * *